United States Patent
Matsushima

(10) Patent No.: US 9,946,127 B2
(45) Date of Patent: Apr. 17, 2018

(54) DISPLAY DEVICE

(71) Applicant: Japan Display Inc., Minato-ku (JP)

(72) Inventor: Toshiharu Matsushima, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/660,398

(22) Filed: Jul. 26, 2017

(65) Prior Publication Data

US 2017/0336685 A1 Nov. 23, 2017

Related U.S. Application Data

(63) Continuation of application No. 14/817,382, filed on Aug. 4, 2015, now Pat. No. 9,835,910.

(30) Foreign Application Priority Data

Aug. 27, 2014 (JP) .................................. 2014-172373

(51) Int. Cl.
*G02F 1/1343* (2006.01)
*G02F 1/1337* (2006.01)

(52) U.S. Cl.
CPC .. *G02F 1/134363* (2013.01); *G02F 1/133707* (2013.01); *G02F 2001/134372* (2013.01)

(58) Field of Classification Search
CPC ... G02F 2001/134372; G02F 1/134363; G02F 1/133707
See application file for complete search history.

(56) References Cited

U.S. PATENT DOCUMENTS

| | | |
|---|---|---|
| 2007/0242205 A1 | 10/2007 | Shimura |
| 2012/0162589 A1 | 6/2012 | Yoso |
| 2013/0100388 A1* | 4/2013 | Matsushima ..... G02F 1/134363 349/123 |
| 2014/0032353 A1 | 1/2014 | Fraser |
| 2014/0092353 A1* | 4/2014 | Matsushima ..... G02F 1/133512 349/110 |
| 2014/0118639 A1 | 5/2014 | Matsushima |
| 2014/0293175 A1 | 10/2014 | Tamaki et al. |
| 2014/0293176 A1 | 10/2014 | Tamaki et al. |
| 2014/0293177 A1 | 10/2014 | Matsushima |
| 2014/0307212 A1 | 10/2014 | Oka et al. |
| 2014/0320791 A1 | 10/2014 | Oiwa et al. |
| 2014/0354931 A1* | 12/2014 | Kurasawa ......... G02F 1/134336 349/124 |

FOREIGN PATENT DOCUMENTS

JP 2014-71309 4/2014

* cited by examiner

*Primary Examiner* — Jia Pan
(74) *Attorney, Agent, or Firm* — Oblon, McClelland, Maier & Neustadt, L.L.P.

(57) ABSTRACT

According to one embodiment, a display device includes first and second substrates, and liquid crystal layer. The first substrate includes first and second electrodes. The second electrode includes comblike electrodes extending in parallel to a first direction and tapered toward tips thereof, and a connecting portion which connects the comblike electrodes. An initial alignment direction is parallel to the first direction or a direction orthogonal to the first direction. The comblike electrode includes a first part having sides each form a first angle with the first direction, and a second part having sides each form a second angle with the first direction, the second angle being greater than the first angle.

9 Claims, 15 Drawing Sheets

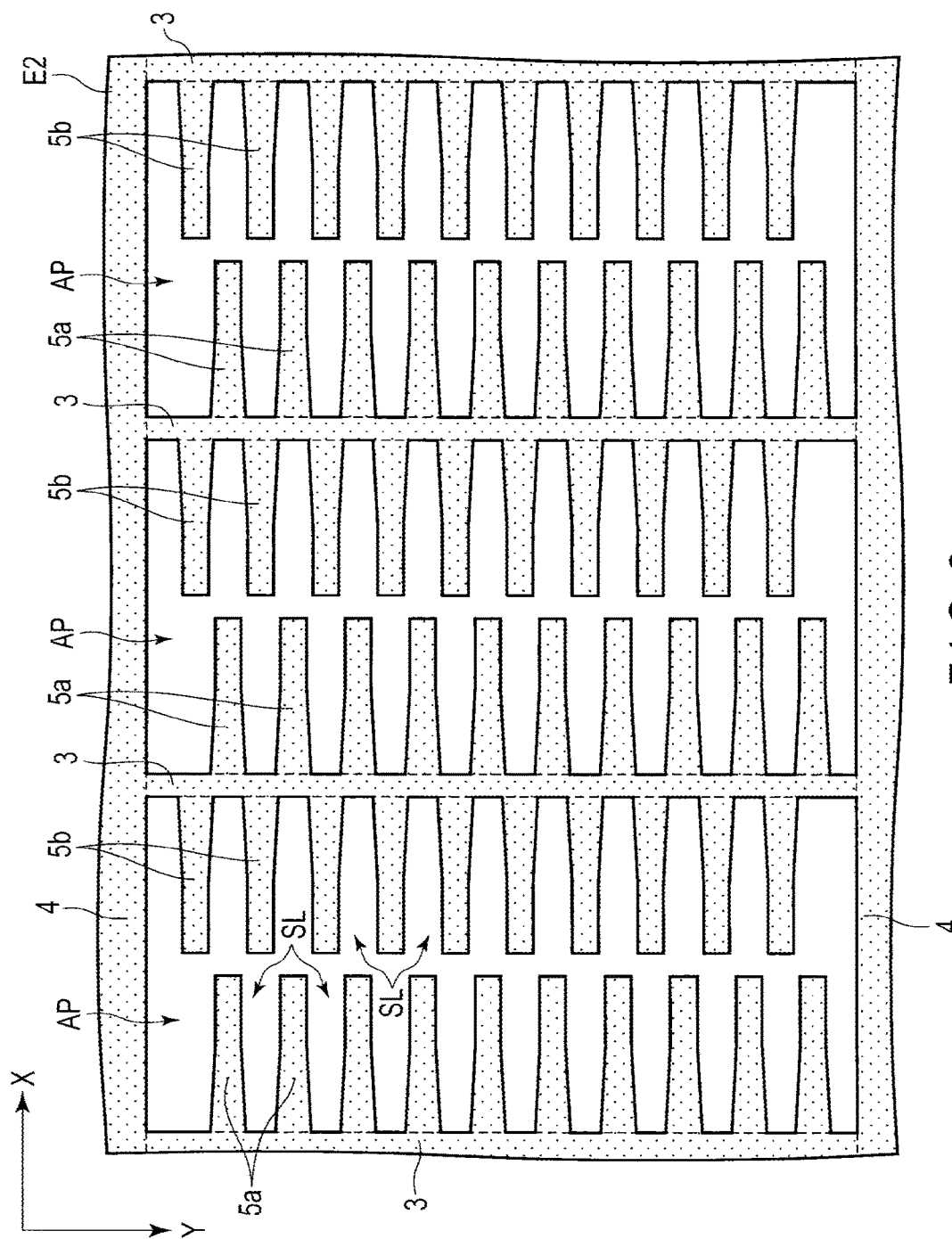
F I G. 2

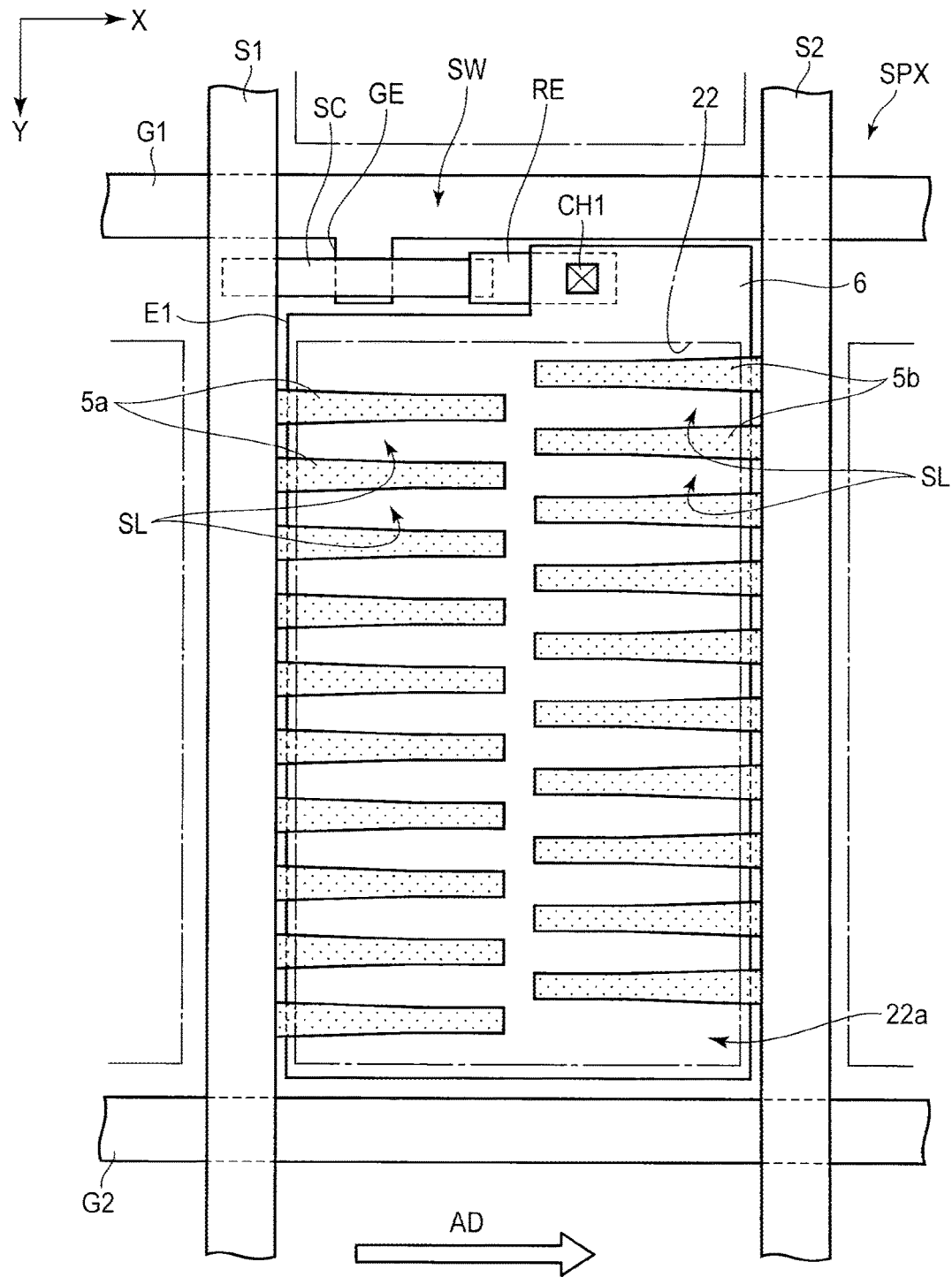
F I G. 4

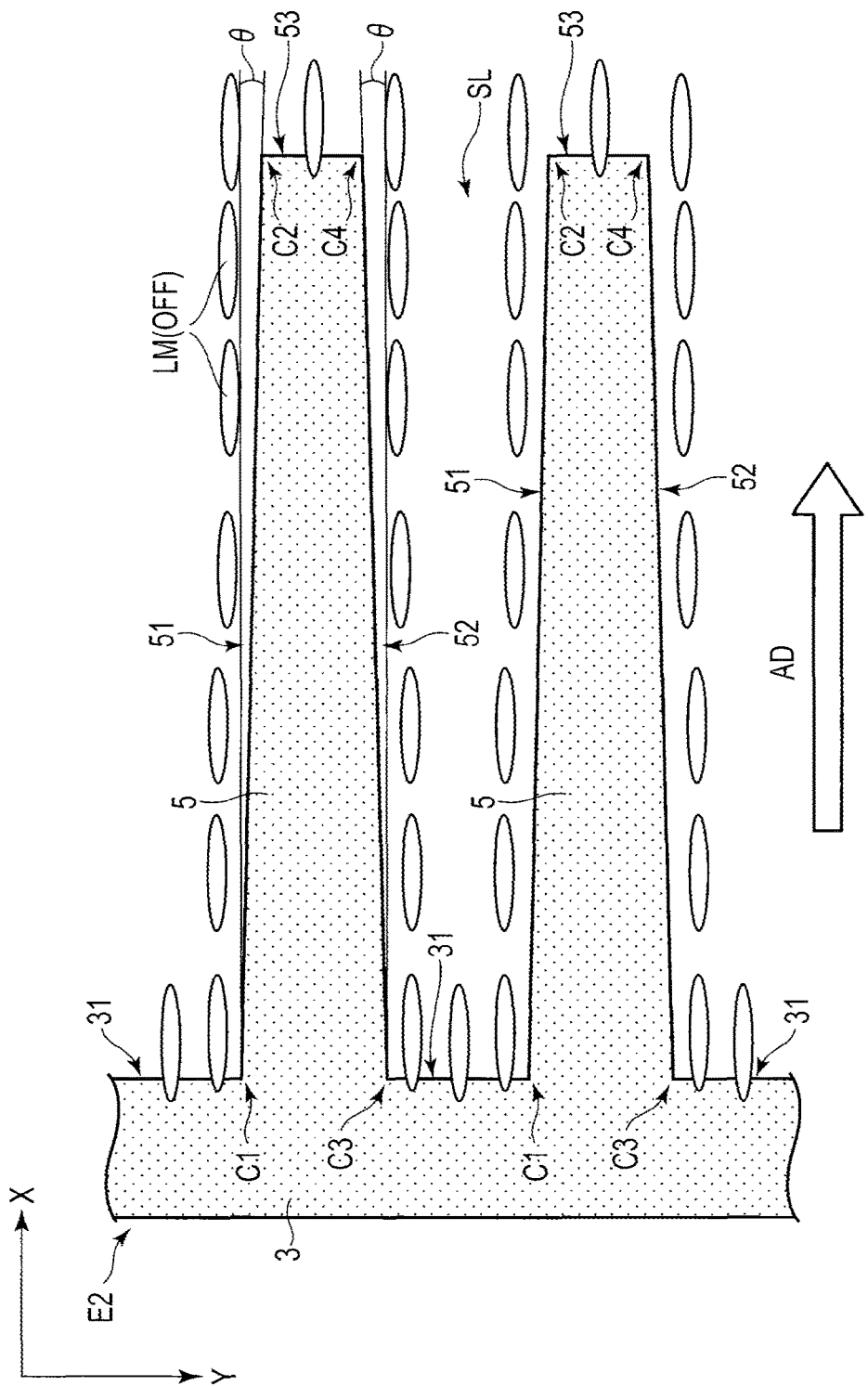
F I G. 5

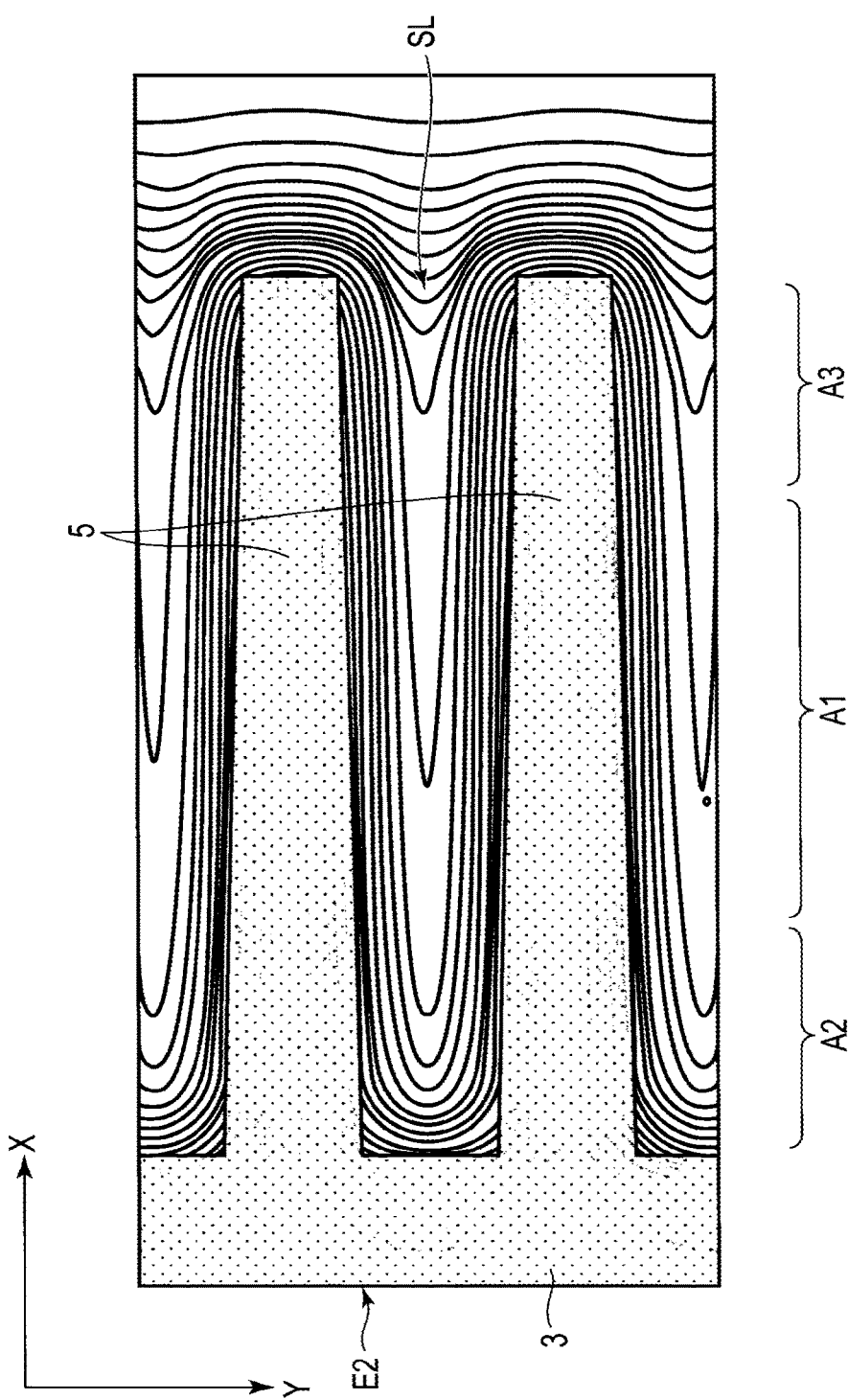
F I G. 6

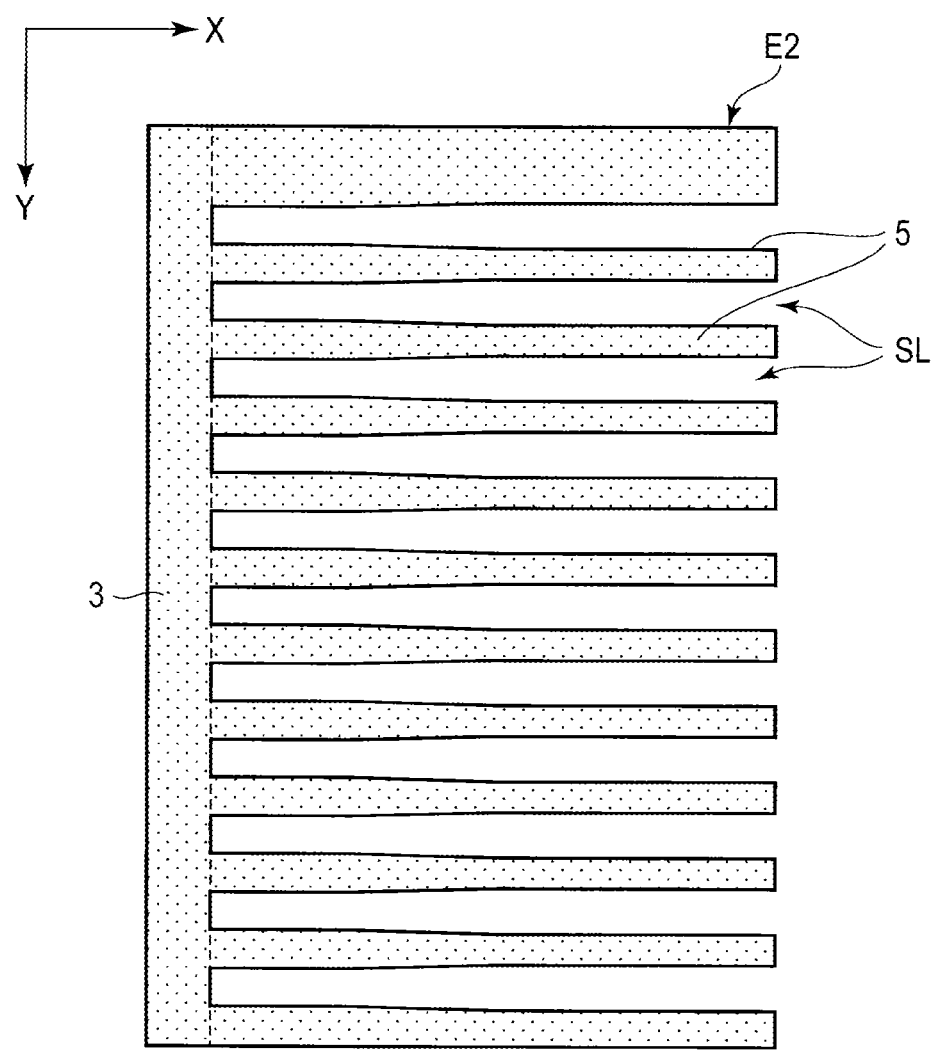
F I G. 13

DISPLAY DEVICE

CROSS-REFERENCE TO RELATED APPLICATIONS

This application is a continuation of and is based upon U.S. application Ser. No. 14/817,382, filed Aug. 4, 2015, which claims the benefit of priority from Japanese Patent Application No. 2014-172373, filed Aug. 27, 2014; the entire contents of which are incorporated herein by reference.

FIELD

Embodiments described herein relate generally to a display device.

BACKGROUND

An in-plane-switching (IPS) mode liquid crystal display device is known as an example of display devices. An IPS mode liquid crystal display device includes a pair of substrates used to seal a liquid crystal layer therein, and a pixel electrode and a common electrode are provided with one of the substrate. In the IPS mode liquid crystal display device, a transverse field produced between these electrodes is used to control the alignment of the liquid crystal molecules in the liquid crystal layer. Further, a fringe field switching (FFS) mode liquid crystal display device is commercially used. In an FFS mode liquid crystal display device, a pixel electrode and a common electrode are arranged on different layers and a fringe field produced therebetween is used to control the liquid crystal molecules.

Here, a high-speed transverse field mode liquid crystal display device is known as a liquid crystal display device with faster response and improved alignment stability as compared to the conventional FFS mode one. In the high-speed transverse field mode liquid crystal display device, a pixel electrode and a common electrode are arranged in different layers and a slit is provided with the electrode which is closer to the liquid crystal layer to rotate the liquid crystal molecules in the proximity of the sides of the slit facing each other in its width direction such that the liquid crystal molecules at one side and the liquid crystal molecules at the other side are rotated in reverse.

As to such a high-speed transverse field mode liquid crystal display device, further improvement of the alignment stability is demanded.

BRIEF DESCRIPTION OF THE DRAWINGS

FIG. 2 schematically shows a shape example applicable to a second electrode shown in FIG. 1.

FIG. 4 is a plan view which shows a layout example of a subpixel composed of the second electrode shown in FIG. 2 and the first electrode shown in FIG. 3.

FIG. 5 is a view used for explanation of a high-speed transverse field mode and shows a part of the second electrode and an initial alignment state of liquid crystal molecules in a liquid crystal layer.

FIG. 6 is a view used for explanation of the high-speed transverse field mode and shows equipotential lines in the liquid crystal layer.

FIG. 13 shows an example of a second electrode having a single-edged structure.

DETAILED DESCRIPTION

In general, according to one embodiment, a display device includes a first substrate, a second substrate, and a liquid crystal layer. The first substrate includes a first electrode, an insulating layer covering the first electrode, a second electrode opposed to the first electrode with the insulating layer interposed therebetween, and a first alignment film covering the second electrode. The second substrate includes a second alignment film opposed to the first alignment film. The liquid crystal layer includes liquid crystal molecules sealed between the first alignment film and the second alignment film. The second electrode includes a plurality of comblike electrodes extending in parallel to a first direction and tapered toward tips thereof, and a connecting portion which connects the comblike electrodes. An initial alignment direction of the liquid crystal molecules is parallel to the first direction or a second direction which is orthogonal to the first direction. The comblike electrode includes a first part having sides opposed to each other in the second direction each form a first angle with the first direction, and a second part having sides opposed to each other in the second direction each form a second angle with the first direction, the second angle being greater than the first angle.

Embodiments are described with reference to accompanying drawings.

Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the Figures as compared to actual embodiments for the sake of simpler explanation, and they are not to limit the interpretation of the invention of the present application. Furthermore, in the description and figures of the present application, structural elements having the same or similar functions will be referred to by the same reference numbers and detailed explanations of them that are considered redundant may be omitted.

First Embodiment

Figure 1:
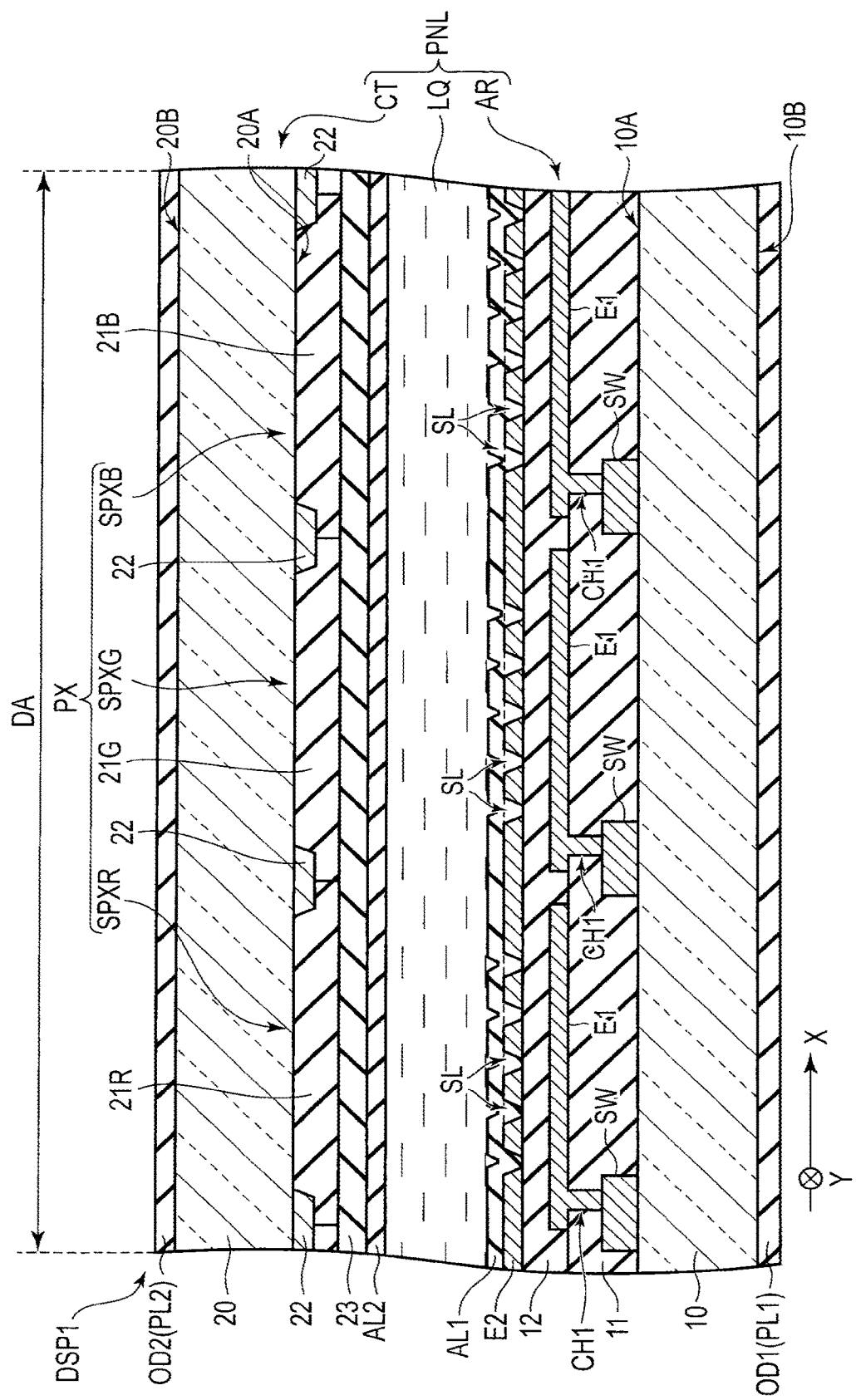
FIG. 1 is a cross-sectional view which shows a part of the structure of a liquid crystal display device of a first embodiment.

FIG. 1 is a cross-sectional view which shows a part of a liquid crystal display device DSP1 of the first embodiment. The liquid crystal display device DSP1 includes, for example, a transmissive display panel PNL of active matrix type.

The display panel PNL includes a plurality of unit pixels PX in a display area DA used for image display. A unit pixel PX is a minimum unit of a color image displayed on the display area DA, and includes a plurality of subpixels SPX corresponding to different colors. In the example of FIG. 1, a unit pixel PX is composed of subpixels SPXR, SPXG, and SPXB corresponding to red, green, and blue arranged in a first direction X. Note that a unit pixel PX may include a subpixel SPX corresponding to white in addition to subpixels SPXR, SPXG, and SPXB.

The display panel PNL includes an array substrate AR, counter substrate CT arranged to be opposed to the array substrate AR, and liquid crystal layer LQ sealed in the array substrate AR and the counter substrate CT. In the present embodiment, liquid crystal molecules included in the liquid crystal layer LQ possess positive dielectric anisotropy.

The array substrate AR includes a first insulating substrate 10 such as a light transmissive glass substrate or resin substrate. The first insulating substrate 10 has a first main surface 10A opposed to the counter substrate CT and a second main surface 10B opposite to the first main surface 10A.

Furthermore, the array substrate AR includes, at the first main surface 10A side of the first insulating substrate 10, a switching element SW, first electrode E1 (lower electrode), second electrode E2 (upper electrode), first insulating layer 11, second insulating layer 12, and first alignment film AL1.

A switching element SW and a first electrode E1 are disposed on a subpixel SPX. The switching element SW is provided with the first main surface 10A of the first insulating substrate 10 and is covered with the first insulating layer 11. The first electrode E1 is formed on the first insulating layer 11. Furthermore, in each subpixel SPX, the first electrode E1 is electrically connected to the switching element SW through a contact hole CH1 provided with the first insulating layer 11.

The first electrode E1 is provided to correspond to each subpixel SPX. The first electrode E1 is covered with the second insulating layer 12. The second electrode E2 is formed on the second insulating layer 12 and faces the first electrode E1. In the example of FIG. 1, the second electrode E2 is shared by the subpixels SPX and has a plurality of slits SL positioned to be opposed to the first electrode E1 of each subpixel SPX.

In the present embodiment, the first electrode E1 functions as a pixel electrode used to selectively supply a voltage to its corresponding subpixel SPX, and the second electrode E2 functions as a common electrode used to supply a common voltage to its corresponding subpixel SPX. The first electrode E1 and the second electrode E2 are formed of a transparent conductive material such as indium tin oxide (ITO) or indium zinc oxide (IZO).

The first alignment film AL1 covers the second electrode E2 and contacts the liquid crystal layer LQ. An alignment treatment such as rubbing treatment or optical alignment treatment has been performed to the first alignment film AL1.

Conversely, the counter substrate CT includes a second insulating substrate 20 such as light transmissive glass substrate or resin substrate. The second insulating substrate 20 has a first main surface 20A opposed to the array substrate AR and a second main surface 20B opposite to the first main surface 20A.

Furthermore, the counter substrate CT includes, at the first main surface 20A side of the second insulating substrate 20, color filters 21R, 21G, and 21B, black matrix 22, overcoat layer 23, and second alignment film AL2.

Color filter 21R is formed of, for example, a resin material painted red and is arranged to correspond to the red subpixel SPXR. Color filter 21G is formed of, for example, a resin material painted green and is arranged to correspond to the green subpixel SPXG. Color filter 21B is formed of, for example, a resin material painted blue and is arranged to correspond to the blue subpixel SPXB.

The black matrix 22 defines subpixels SPXR, SPXG, and SPXB. Boundaries of color filters 21R, 21G, and 21B overlap the black matrix 22. The overcoat layer 23 covers color filters 21R, 21G, and 21B and evens the surfaces of color filters 21R, 21G, and 21B.

The second alignment film AL2 covers the overcoat layer 23 and contacts the liquid crystal layer LQ. As with the first alignment film AL1, an alignment treatment such as a rubbing treatment or an optical alignment treatment has been performed to the second alignment film AL2.

On the outer surface of the array substrate AR, that is, on the second main surface 10B of the first insulating substrate 10, a first optical element OD1 including a first polarizer PL1 is disposed. Furthermore, on the outer surface of the counter substrate CT, that is, on the second main surface 20B of the second insulating substrate 20, a second optical element OD2 including a second polarizer PL2 is disposed. A first polarization axis (first absorption axis) of the first polarizer PL1 and a second polarization axis (second absorption axis) of the second polarizer PL2 are orthogonal to each other as in a crossed-Nicol relationship.

The liquid crystal display device DSP1 with the above structure selectively transmits incident light from the first optical element OD1 through subpixels SPX to display an image on in the display area DA.

FIG. 2 schematically shows a shape example of the second electrode E2 of FIG. 1. The second electrode E2 as depicted includes a plurality of apertures AP. Apertures AP are arranged to face the first electrodes E1 of the subpixels SPX.

Each aperture AP is defined by a connecting portion 3 extending in a second direction Y which crosses the first direction X and a connecting portion 4 extending in the first direction X. In the example of FIG. 2, the second direction Y is orthogonal to the first direction X. From the connecting portion 3, a plurality of comblike electrodes 5 (5a, 5b) extend toward the center axis of the aperture AP.

Note that, in the example of FIG. 2, comblike electrodes are formed in a double-edged manner such that comblike electrodes 5a extend from a side of the connecting portion 3 (right edge) in the first direction X and comblike electrodes 5b extend from the other side of the connecting portion 3 (left edge) in the first direction X counter to the comblike electrodes 5a.

Both comblike electrodes 5a and 5b extend parallel to the first direction X and are tapered toward their tips. Comblike electrodes 5a extending from one connecting portion 3 are arranged with certain intervals along the second direction Y. Furthermore, comblike electrodes 5b extending from one connecting portion 3 are arranged with certain intervals along the second direction Y. Spaces defined by comblike electrodes 5a and spaces defined by comblike electrodes 5b correspond to the slits SL. The slits SL are formed parallel to the first direction X as with comblike electrodes 5a and 5b.

In the example of FIG. 2, comblike electrodes 5a and 5b are formed in the same shape, and an arrangement pitch of each of comblike electrodes 5a adjacent in the second direction Y and an arrangement pitch of each of comblike electrodes 5b adjacent in the second direction Y are the same. Comblike electrodes 5a and 5b are arranged alternately in the second direction Y.

Note that comblike electrodes 5a and 5b may be formed in different shapes with different arrangement pitches. Furthermore, comblike electrodes 5a and 5b may not be arranged alternately in the second direction Y but may be arranged on single straight lines parallel to each other in the first direction X.

Figure 3:
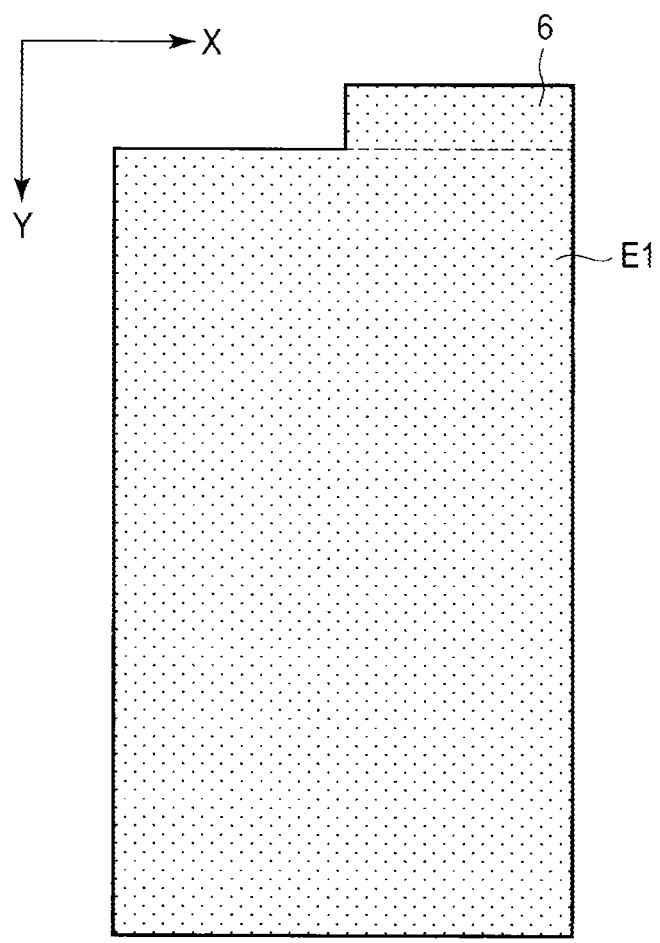
FIG. 3 schematically shows a shape example applicable to a first electrode shown in FIG. 1.

FIG. 3 schematically shows a shape example of the first electrode E1 of FIG. 1. In this example, the first electrode E1 is formed in a flat panel shape without a slit or the like formed thereon, and is substantially a rectangle of which side along the first direction X is shorter than its side along the second direction Y. Furthermore, in the example depicted, the first electrode E1 includes a contact portion 6 used for the electric connection to the switching element SW.

FIG. 4 is a plan view which shows a layout example of a subpixel SPX composed of the second electrode E2 of FIG. 2 and the first electrode E1 of FIG. 3. In the example depicted, the area of the subpixel SPX is defined by gate lines G1 and G2 extending parallel to each other in the first direction X and source lines S1 and S2 extending parallel to each other in the second direction Y.

The switching element SW includes a semiconductor layer SC, gate electrode GE, and relay electrode RE. One end of the semiconductor layer SC is electrically connected to source line S1 and the other end of the semiconductor layer SC is electrically connected to the relay electrode RE. Between these ends, the semiconductor layer SC faces the gate electrode GE. The gate electrode GE is formed integrally with gate line G1, for example. The relay electrode RE is electrically connected to the contact portion 6 of the first electrode E1 through the contact hole CH1.

In FIG. 4, alternate long and short dashed lines indicate the edge of the black matrix 22. That is, the black matrix 22 is opposed to gate lines G1 and G2, source lines S1 and S2, switching element SW, and contact portion 6. The black matrix 22 forms a pixel opening 22a within the area surrounded by gate lines G1 and G2 and source lines S1 and S2.

The comblike electrodes 5a and 5b of the second electrode E2 extend within the pixel opening 22a. Note that depiction of the connecting portion 3 and the connecting portion 4 is omitted from FIG. 4.

The first alignment film AL1 in FIG. 1 has been subjected to an alignment treatment to align the molecules in an alignment treatment direction AD which is parallel to the first direction X. On the other hand, the second alignment film AL2 has been subjected to an alignment treatment to align the molecules in the alignment treatment direction AD or in the opposite direction. That is, in the liquid crystal display device DSP1 of the present embodiment, the direction in which the comblike electrodes 5a and 5b and the slits SL extend and the alignment treatment direction AD (initial alignment direction of the liquid crystal molecules) are substantially the same.

As explained above, the first electrode E1 and the second electrode E2 are opposed to each other with the second insulating layer 12 interposed therebetween, and the comblike electrodes 5 are provided with the second electrode E2 which is positioned as the liquid crystal layer LQ side in such a manner that the comblike electrodes 5 and the slits SL extend to conform to the alignment treatment direction AD. With this structure, a high-speed transverse field mode with faster response as compared to a conventional FFS mode can be achieved in the present embodiment. The response speed mentioned here will be defined as a speed of transition of light transmissivity of the liquid crystal layer LQ within certain degrees by applying a voltage between the first electrode E1 and the second electrode E2.

A principle of the high-speed transverse field mode will be explained with reference to FIGS. 5 to 8. Note that FIGS. 5 to 8 are only used for the explanation of the outline of the high-speed transverse field mode and show trapezoidal comblike electrodes 5 tapered toward their tips as an exemplification. The shape of the comblike electrode 5 of the present embodiment will be described later with reference to FIG. 9.

FIG. 5 shows a part of the second electrode E2 and liquid crystal molecules LM in their initial alignment state in the liquid crystal layer LQ. A comblike electrode 5 of the second electrode E2 has a pair of first side 51 and second side 52 opposed to each other in the width direction (second direction Y) and a top side 53 bridging between the first side 51 and the second side 52. The first side 51 is inclined clockwise at an acute angle θ (approximately 1.0 degrees, for example) with respect to the alignment treatment direction AD and second side 52 is inclined counterclockwise at angle θ with respect to the alignment treatment direction AD. Furthermore, between two adjacent comblike electrodes 5, a base side 31 is formed by the connecting portion 3. The base side 31 and the first side 51 form a corner C1, the first side 51 and the top side 53 form a corner C2, the base side 31 and the second side 52 form a corner C3, and the second side 52 and the top side 53 form a corner C4.

In an off-state where no voltage is applied between the first electrode E1 and the second electrode E2, liquid crystal molecules LM are in the initial alignment such that their longitudinal axes conform to the alignment treatment direction AD as shown in FIG. 5. That is, in the example of FIG. 5, the initial alignment direction of the liquid crystal molecules LM is parallel to the first direction X.

In an on-state where a voltage is applied between the first electrode E1 and the second electrode E2, a field is produced between these electrodes. FIG. 6 shows equipotential lines of the liquid crystal layer LQ in the produced field. The equipotential lines represent the potential on the X-Y plane at a certain height from the first alignment film AL1, and a direction perpendicular to the equipotential lines corresponds to the direction of the field.

Equipotential lines near the first side 51 and the second side 52 become substantially parallel to these sides in a middle area A1 of the comblike electrodes 5 in the first direction X. Equipotential lines are bent at approximately 180 degrees in an arc shape along the shape of the slit SL in a base area A2 near the connecting portion 3. Furthermore, equipotential lines are bent at approximately 180 degrees in an arc shape along the shape of the comblike electrode 5 in a top area A3 near the top side 53.

Figure 7:
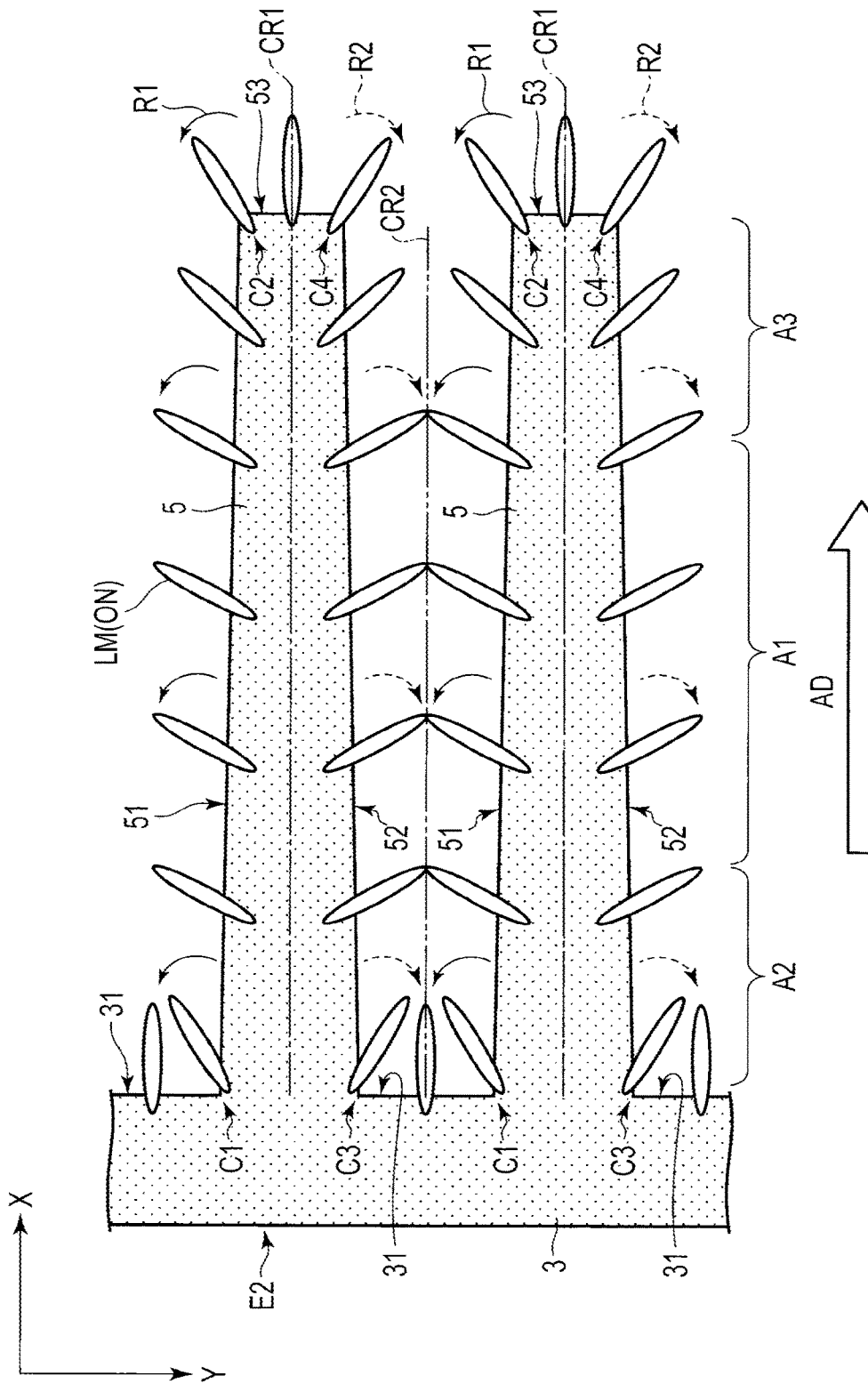
FIG. 7 is a view used for explanation of the high-speed transverse field mode and shows an alignment state of liquid crystal molecules in an on-state.

FIG. 7 shows an alignment state of liquid crystal molecules LM in the on-state. The liquid crystal molecules LM of the present embodiment possess positive dielectric anisotropy. Thus, upon application of a voltage between the first electrode E1 and the second electrode E2 in the off-state in FIG. 5, a force is produced to rotate the liquid crystal molecules LM in such a manner that their longitudinal axes become parallel to the direction of the field produced by the application of a voltage (or, their longitudinal axes become orthogonal to the equipotential lines).

In the proximity of corners C1 and C2, liquid crystal molecules LM rotate in a first rotational direction R1 which is indicated by a solid line. Furthermore, in the proximity of corners C3 and C4, liquid crystal molecules LM rotate in a second rotational direction R2 which is indicated by a dotted line. The first rotational direction R1 is opposite to the second rotational direction R2. In the example of FIG. 7, the first rotational direction R1 is counterclockwise and the second rotational direction R2 is clockwise.

An alignment control function which controls a rotational direction of liquid crystal molecules LM in the proximity of the first side 51 and the second side 52 (in other words, an alignment stabilization function) is imparted to each of corners C1 to C4. That is, liquid crystal molecules LM in the proximity of the first side 51 rotate in the first rotational direction R1 according to the rotation of the liquid crystal molecules LM in the proximity of corners C1 and C2. Liquid crystal molecules LM in the proximity of the second side 52 rotate in the second rotational direction R2 according to the rotation of the liquid crystal molecules LM in the proximity of corners C3 and C4. Here, focusing on the proximity of the center CR1 of the comblike electrode 5 and the proximity of the center CR2 of the slit SL in the second direction Y, the liquid crystal molecules LM rotating in the first rotational direction R1 and the liquid crystal molecules LM rotating in the second rotational direction R2 counterbalance with each other. Therefore, liquid crystal molecules LM in the proximity of these centers are maintained in their initial alignment state and rotate very little.

As can be understood from the above, in the high-speed transverse field mode, rotational directions of the liquid crystal molecules LM are regular from the base side 31 to the top side 53 in the proximity of the first side 51 and the second side 52. Consequently, the response speed in the application of a voltage can be increased, and alignment stability can be improved because irregularity of rotational directions of the liquid crystal molecules LM is suppressed.

Furthermore, even if the alignment of the liquid crystal molecules LM is temporarily disordered by an external impact, the alignment directions of the liquid crystal molecules in the proximity of the first side 51 and the second side 52 can be restored based on the works of the liquid crystal molecules LM in the proximity of corners C1 to C4.

Furthermore, in the structure where comblike electrodes 5a and 5b are arranged alternately in the second direction Y as shown in FIGS. 2 and 4, the first side 51 of the comblike electrode 5a and the second side 52 of the comblike electrode 5b are basically aligned on the same straight line and the second side 52 of the comblike electrode 5a and the first side 51 of the comblike electrode 5b are basically aligned on the same straight line in subpixel SPX. Furthermore, since the comblike electrodes 5a and 5b extend in opposite directions, the liquid crystal molecules LM in the proximity of the first side 51 of the comblike electrode 5a and the liquid crystal molecules LM in the proximity of the second side 52 of the comblike electrode 5b rotate in the same direction. Similarly, the liquid crystal molecules LM in the proximity of the second side 52 of the comblike electrode 5a and the liquid crystal molecules LM in the proximity of the first side 51 of the comblike electrode 5b rotate in the same direction. This means that the rotational directions of the liquid crystal molecules become regular in the entire comblike electrodes 5a and 5b in subpixel SPX, and the response speed can be increased more.

Figure 8:
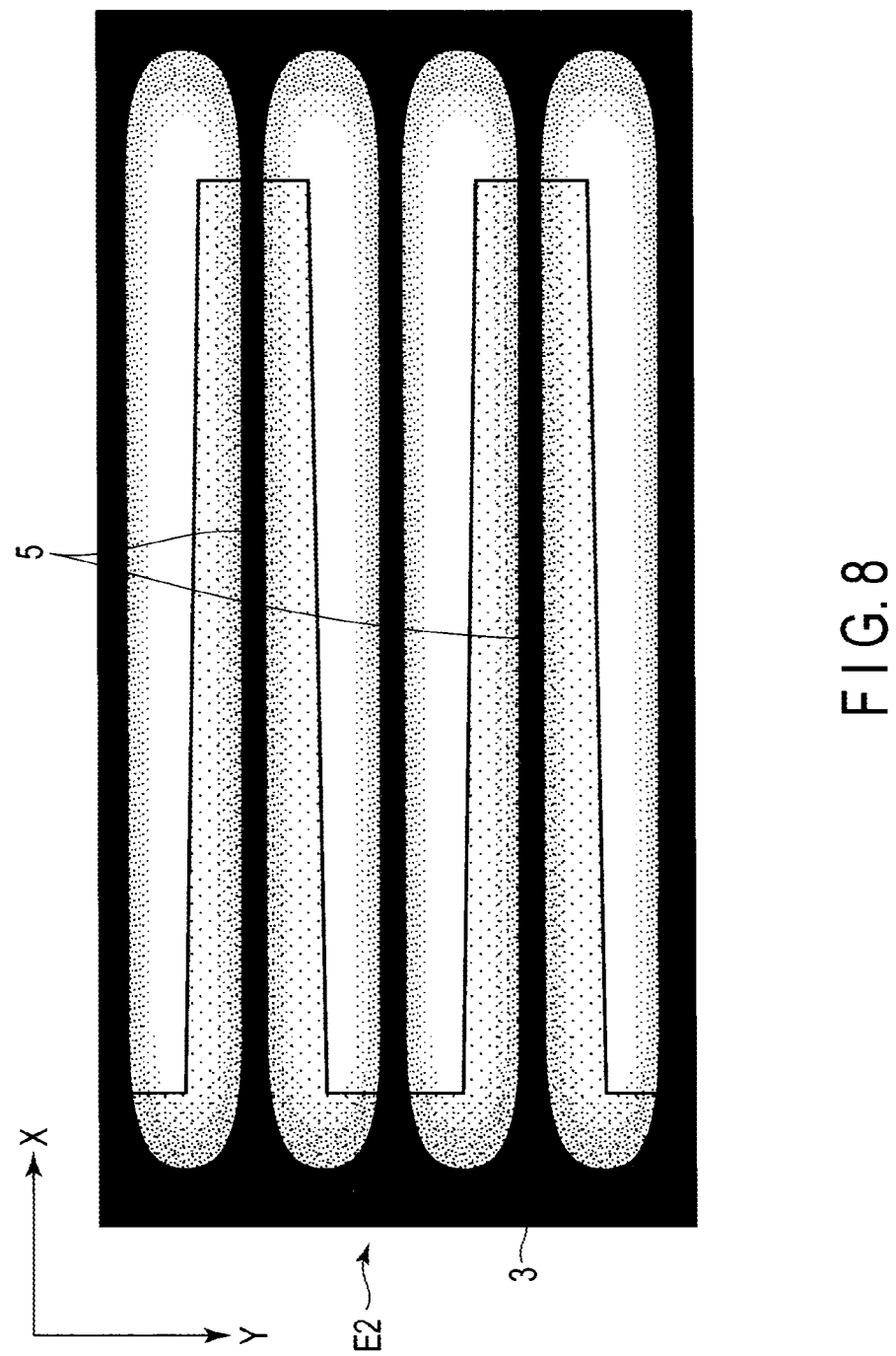
FIG. 8 is a view used for explanation of the high-speed transverse field mode and shows luminosity distribution of light passing through a subpixel in the on-state.

FIG. 8 shows luminosity distribution of light passing through a subpixel SPX in the on-state. On gray scale, the luminosity becomes higher in brighter parts and becomes lower in darker parts. In the off-state of FIG. 5, light incident on the first optical element OD1 partially passes through the first polarizer PL1 and enters the display panel PNL. The light which enters the display panel PNL is linearly polarized light orthogonal to a first polarization axis of the first polarizer PL1. The polarization state of such linearly polarized light hardly changes when passing through the display panel PNL in the off-state. Therefore, the linearly polarized light which passes through the display panel PNL is absorbed by the second polarizer PL2 which is in a crossed-Nicol relationship with the first polarizer PL1.

Conversely, a polarization state of light which passes through the first polarizer PL1 and enters the display panel PNL in the on-state shown in FIG. 7 changes when passing through the liquid crystal layer LQ based on an alignment state of liquid crystal molecules LM (or retardation in the liquid crystal layer). Therefore, the light which passes through the liquid crystal layer LQ partially passes through the second polarizer PL2 in the proximity of the first side 51 and the second side 52 where the liquid crystal molecules LM are rotated from their initial alignment state. Consequently, the luminosity in the proximity of the first side 51 and the second side 52 becomes high as shown in FIG. 8. Conversely, the luminosity in the proximity of the center CR1 of the comblike electrode 5 and the center CR2 of the slit SL becomes low since the liquid crystal molecules LM therein rotate very little from their initial alignment state.

Note that the first side 51 and the second side 52 are inclined with respect to the alignment treatment direction AD in the comblike electrodes 5 shown in FIGS. 5 to 8, and this structure helps the improvement of the alignment stability. Specifically, in the proximity of the first side 51 and the second side 52 those are inclined with respect to the alignment treatment direction AD, the direction of the field crosses the alignment treatment direction AD at any angle except right angles, and thus, the rotational directions of the liquid crystal molecules LM in the application of a voltage can be set substantially regular. As is evident from FIG. 6, the first side 51 and the second side 52 are substantially parallel to the equipotential lines, and thus, the function of corners C1 to C4 weakens in the middle area A1. This will be adverse to the alignment stability. However, with the first side 51 and the second side 52 inclined with respect to the alignment treatment direction AD, excellent alignment stability can be secured in the middle area A1.

For further improvement of the alignment stability, an angle formed by the first side 51 and the second side 52 with the alignment treatment direction AD needs to be sufficiently large. However, securing a sufficient angle is sometimes difficult for design limitation of pixels and process limit of patterning. For example, the width of the comblike electrode 5 and the width of slit SL must be designed to be greater than the process limit. Therefore, if the arrangement pitch of each of the comblike electrodes 5 in the second direction Y is small or the length of the comblike electrodes 5 is unchangeable, the comblike electrode 5 cannot have a sufficient difference between the width at its base and the width at its tip, and therefore, the angle formed by the first side 51 and the second side 52 with the alignment treatment direction AD cannot be sufficiently large.

Figure 9:
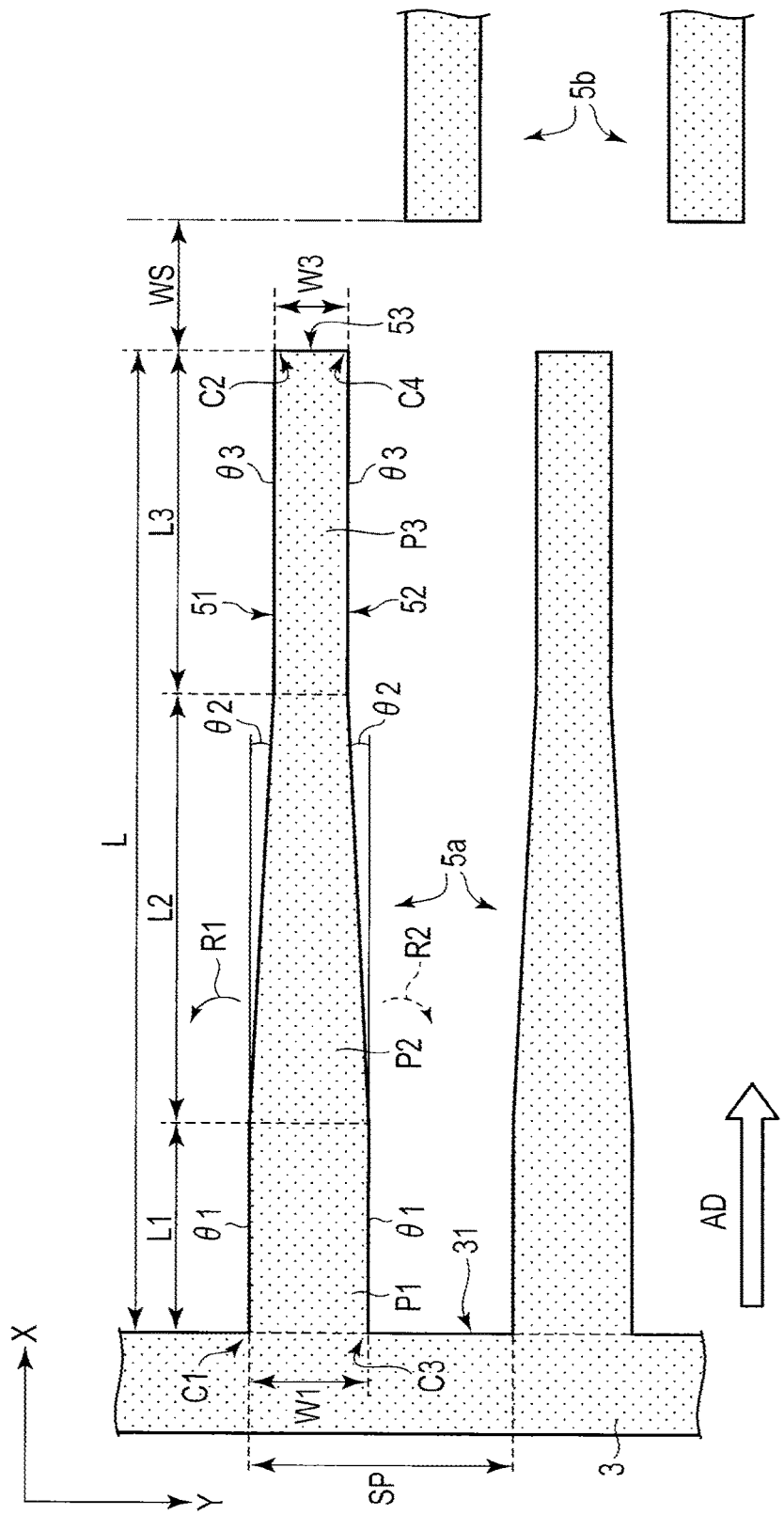
FIG. 9 schematically shows a shape of comblike electrodes in one embodiment.

To deal with the above problem, the shape of the comblike electrode 5 is improved in the present embodiment. FIG. 9 schematically shows a shape of the comblike electrode 5 in the present embodiment. The figure exemplifies the comblike electrodes 5a arranged with a pitch SP in the second direction and having a length L; however, the same shape can be applied to the comblike electrode 5b. For example, the comblike electrodes 5a and comblike electrodes 5b can be formed to be symmetrical with respect to an axis parallel to the second direction Y.

In the example of FIG. 9, the comblike electrode 5a includes a first part P1, second part P2, and third part P3. The first part P1 is at the base side of the comblike electrode 5a (at the connecting portion 3 side). The third part P3 is at the tip side of the comblike electrode 5a (at the top side 53). The second part P2 is between the first part P1 and the third part P3.

The first side 51 is inclined at angle θ1 which is acute or zero in a clockwise manner with respect to the first direction X within the first part P1. The second side 52 is inclined at angle θ1 in a counterclockwise manner with respect to the first direction X within the first part P1. In the example of FIG. 9, angle θ1 is zero. That is, the width of the first part P1 is the same as the width W1 of the base of the comblike electrode 5a (joint position with the connecting portion 3) in the entirety of the first part P1.

The first side 51 is inclined at angle θ3 which is acute or zero in a clockwise manner with respect to the first direction X within the third part P3. The second side 52 is inclined at angle θ3 in a counterclockwise manner with respect to the first direction X within the third part P3. In the example of FIG. 9, angle θ3 is zero. That is, the width of the third part P3 is the same as the width W3 of the tip of the comblike electrode 5a (top side 53) in the entirety of the third part P3.

The first side 51 is inclined at angle θ2 which is acute in a clockwise manner with respect to the first direction X within the second part P2. The second side 52 is inclined at angle θ2 in a counterclockwise manner with respect to the first direction X. That is, the width of the second part P2 gradually decreases from the first part P1 side toward the third part P3 side. Angle θ2 is greater than both angles θ1 and θ3 (θ2>θ1 and θ3). For example, angle θ2 is greater than or equal to 0.5 degrees, and should preferably be greater than or equal to 1.0 degrees.

A gap corresponding to a slit width WS is provided between the comblike electrode 5a and the comblike electrode 5b. In the example of FIG. 9, the slit width WS takes a positive value (WS>0); however, the slit width SW may take a negative value (WS<0). In that case, a tip of a comblike electrode 5b is inserted between a slit SL defined by a pair of comblike electrodes 5a, and a tip of a comblike electrode 5a is inserted between a slit SL defined by a pair of comblike electrodes 5b. Alternately, the slit width WS may be zero (WS=0).

When a voltage is applied between the comblike electrodes 5a with the above structure and the first electrode E1, liquid crystal molecules LM in the proximity of the first part P1 and the third part P3 rotate in the first rotational direction R1 or in the second rotational direction R2 by the function of corners C1 to C4 as explained above with reference to FIGS. 5 to 8.

Conversely, the function of corners C1 to C4 weakens in the proximity of the second part P2. This is evident from the equipotential lines in the middle area A1 which are substantially parallel to the first side 51 and the second side 52 in FIG. 6. However, the first side 51 and the second side 52 in the second part 2 are inclined at angle θ2 with respect to the alignment treatment direction AD and excellent alignment stability can be secured. That is, the liquid crystal molecules LM in the proximity of the first side 51 rotate regularly in the first rotational direction R1 and the liquid crystal molecules LM in the proximity of the second side 52 rotate regularly in the second rotational direction R2.

As described above, angle θ2 should preferably be set sufficiently large to improve the alignment stability. In this respect, the comblike electrode 5a in FIG. 9 is formed such that the first side 51 and the second side 52 in the first and third parts P1 and P3 are inclined with respect to the alignment treatment direction AD at an angle smaller than those in the second part P2. Therefore, angle θ2 formed by the first side 51 and the second side 52 with the alignment treatment direction AD in the second part P2 can be set large. Even if such factors as a design limitation of pixels and a process limit of patterning restrict a change in length L, width W1 of the base, width W3 of the tip, and the like of the comblike electrode 5a, excellent alignment stability can be secured.

Note that parameters of the comblike electrode 5a including, for example, length L1 of the first part P1 in the first direction X, length L2 of the second part P2 in the first direction X, length L3 of the third part P3 in the first direction X, and angle θ2 can arbitrarily be determined based on the entire length L of the comblike electrode 5a, pitch SP, thickness of the liquid crystal layer LQ, and the like.

The inventors studied the alignment stability in two cases: one is case (A) where a liquid crystal layer LQ having a thickness of 2.9 μm includes rectangular comblike electrodes 5 each having a length of 10 μm, and the other is case (B) where a liquid crystal layer LQ having the same thickness includes rectangular comblike electrodes 5 each having a length of 15 μm. As a result, good alignment stability was confirmed in case (A) in the application of a voltage while alignment disorder was confirmed in case (B) in the application of a voltage. This is because the alignment control function of corners C1 to C4 was effective in the entirety of the first side 51 and the second side 52 in case (A) while the function did not work in the middle part of the first side 51 and the second side 52 in case (B). According to this study, the limitation of lengths L1 and L3 is estimated to be somewhere between 5 to 7.5 μm to achieve excellent alignment stability under the conditions of cases (A) and (B). Therefore, lengths L1 and L3 should preferably be set less than or equal to 5 μm. For example, if a comblike electrode 5a has a length L of 21 μm, L1 and L3=5 μm and L2=11 μm.

Second Embodiment

Now, the second embodiment will be explained. Structural elements of the second embodiment which are the same as or similar to those of the first embodiment will be referred to by the same reference numbers and their details will be omitted.

Figure 10:
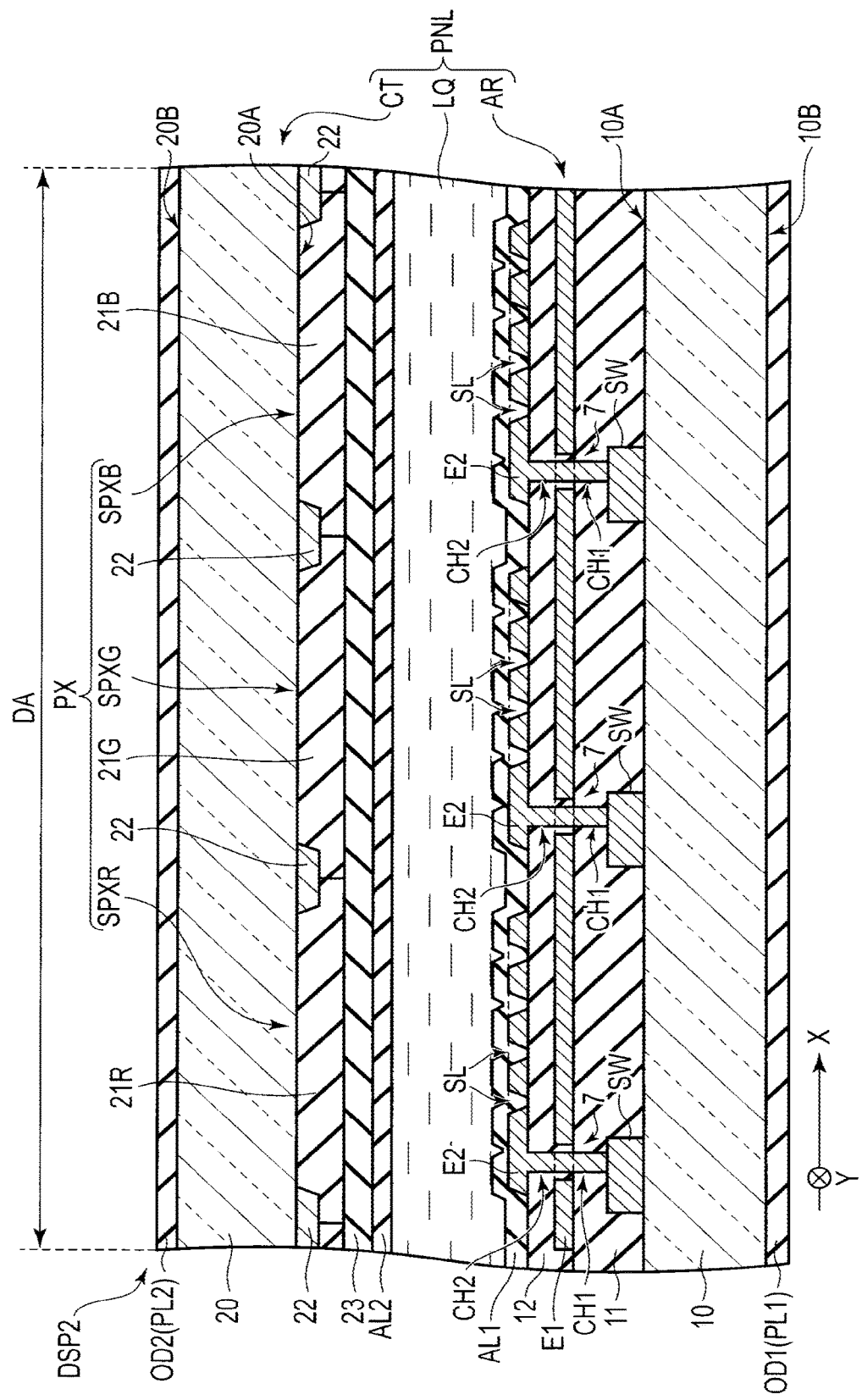
FIG. 10 is a cross-sectional view which shows a part of the structure of a liquid crystal display device of a second embodiment.

FIG. 10 is a cross-sectional view which shows a part of the structure of a liquid crystal display device DSP2 of the present embodiment. The liquid crystal display device DSP2 includes a first electrode E1 which functions as a common electrode and a second electrode E2 which functions as a pixel electrode. In this respect, the liquid crystal display device DSP2 differs from the liquid crystal display device DSP1.

The first electrode E1 is provided through subpixels SPXR, SPXG, and SPXB and includes openings 7 at positions corresponding to the second electrodes E2 in subpixels SPXR, SPXG, and SPXB.

Second electrodes E2 are provided with respective subpixels SPX. Each second electrode E2 includes a plurality of slits SL. Furthermore, the second electrodes E2 are electrically connected to switching elements of respective subpixels SPXR, SPXG, and SPXB through the openings 7, contact holes CH1 formed in the first insulating layer 11, and contact holes CH2 formed in the second insulating layer 12.

Figure 11:
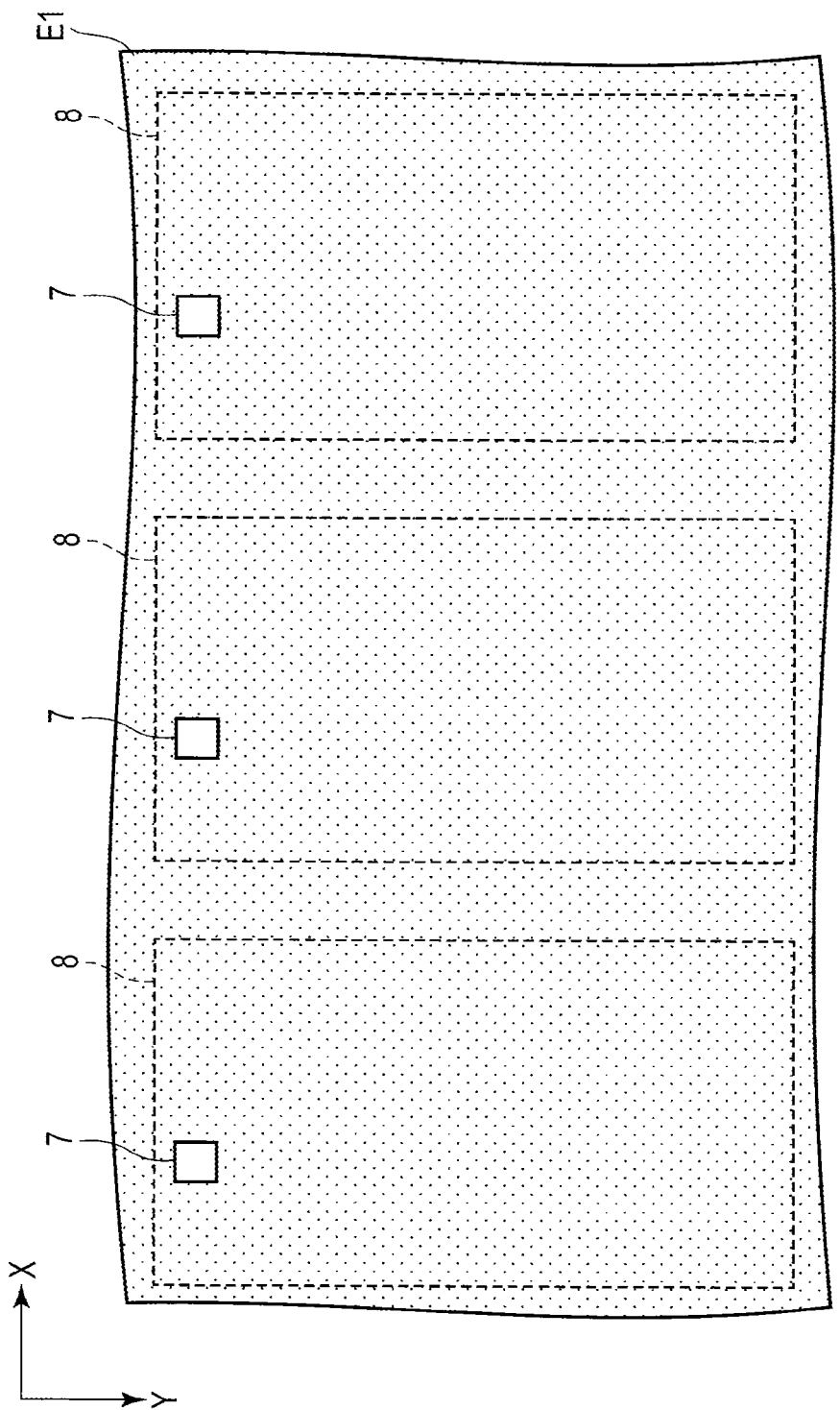
FIG. 11 schematically shows a shape example applicable to a first electrode shown in FIG. 10.

FIG. 11 schematically shows a shape example applicable to the first electrode E1 of FIG. 10. In the example depicted, an area 8 opposed to the second electrode E2 of each subpixel SPX is indicated by dotted lines.

The first electrode E1 includes the openings 7 at the position corresponding to both the contact holes CH1 and CH2. Except the openings 7, the first electrode E1 is formed uniformly without a slit or the like.

Figure 12:
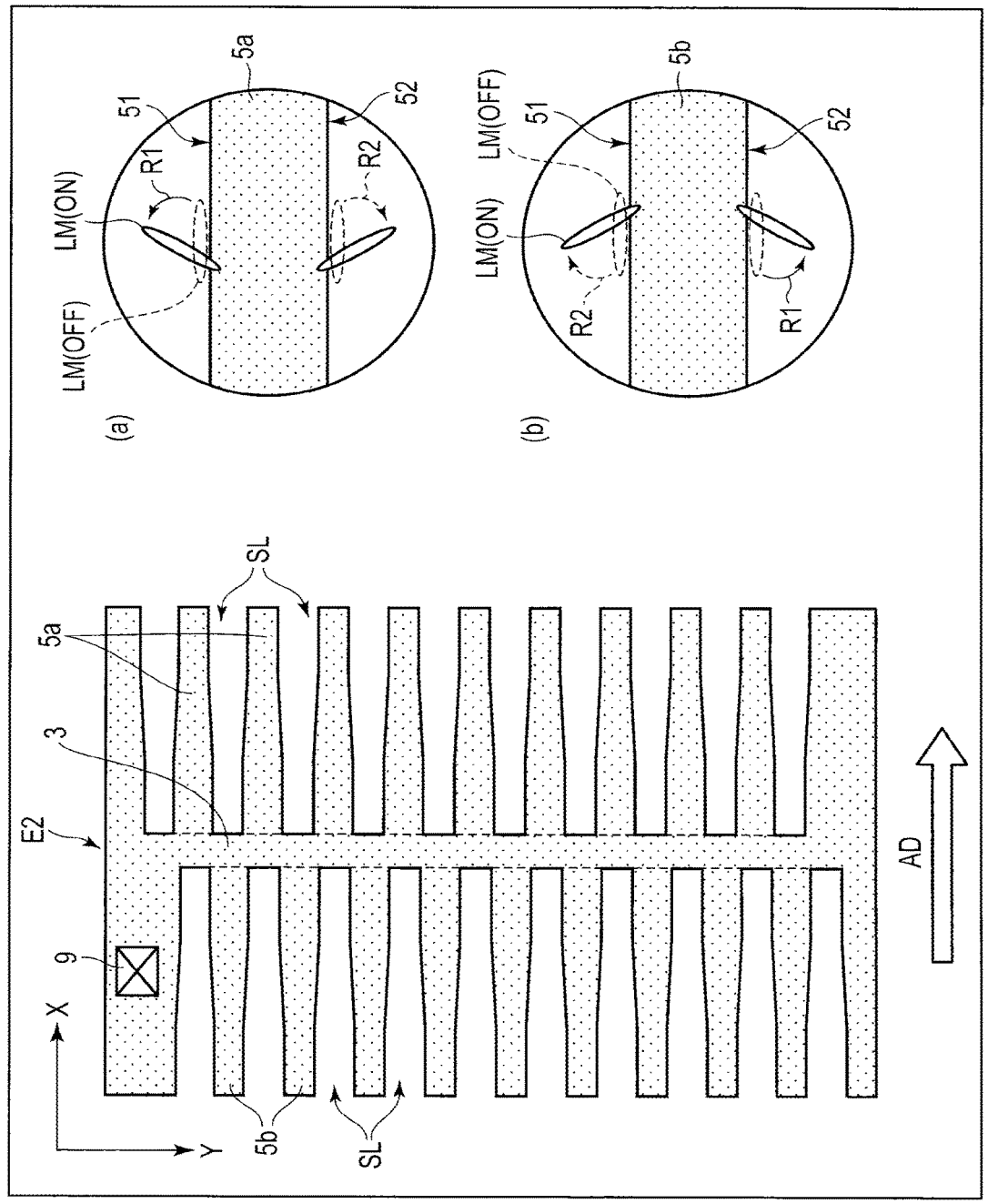
FIG. 12 schematically shows a shape example applicable to a second electrode shown in FIG. 10.

FIG. 12 schematically shows a shape example applicable to the second electrode E2 of FIG. 10. In the example depicted, the second electrode E2 includes a connecting portion 3 extending along the second direction Y and a plurality of comblike electrodes 5 (5a, 5b) extending from both sides of the connecting portion 3.

In the example of FIG. 12, the connecting portion 3 is formed in a double-edged structure in which comblike electrodes 5a extend from one side of the connecting portion 3 (right edge) and comblike electrodes 5b extend from the other side of the connecting portion 3 (left edge).

Comblike electrodes 5a and 5b extend parallel to the first direction X and are tapered toward their tips. In the present embodiment, comblike electrodes 5a and 5b extend in the direction conforming to the alignment treatment direction AD as in the above embodiment.

Comblike electrodes 5a are arranged along the second direction Y with certain intervals. Furthermore, comblike electrodes 5b are arranged along the second direction Y with certain intervals. Spaces defined by comblike electrodes 5a and spaces defined by comblike electrodes 5b correspond to the slits SL.

In the example of FIG. 12, comblike electrodes 5a and 5b are formed in the same shape, and an arrangement pitch of each of comblike electrodes 5a adjacent in the second direction Y and an arrangement pitch of each of comblike electrodes 5b adjacent in the second direction are the same. Comblike electrodes 5a and 5b are arranged alternately in the second direction Y.

Note that comblike electrodes 5a and 5b may be formed in different shapes with different arrangement pitches. Furthermore, comblike electrodes 5a and 5b may not be arranged alternately in the second direction Y but may be arranged on the same lines.

A contact position 9 corresponds to the opening 7 and the second electrode E2 contacts the switching element SW at the contact position 9.

The shape composed of the first part P1, second part P2, and third part P3 as shown in FIG. 9 can be applied to comblike electrodes 5a. The same shape can be applied to comblike electrodes 5b. For example, the comblike electrodes 5a and comblike electrodes 5b can be formed to be symmetrical with respect to an axis parallel to the second direction Y.

Liquid crystal molecules LM in the proximity of comblike electrodes 5a and 5b act the same as described in the first embodiment. That is, as in FIG. 12 (a), when a voltage is applied between the first electrode E1 and the second electrode E2, liquid crystal molecules LM in the proximity of the first side 51 of the comblike electrode 5a rotate in the first rotational direction R1 over the entire length of the first side 51, and liquid crystal molecules LM in the proximity of the second side 52 rotate in the second rotational direction R2 which is opposite to the first rotational direction R1 over the entire length of the second side 52. Furthermore, as in FIG. 12 (b), liquid crystal molecules LM in the proximity of the first side 51 of the comblike electrode 5b rotate in the second rotational direction R2 over the entire length of the first side 51, and liquid crystal molecules LM in the proximity of the second side 52 rotate in the first rotational direction R1 over the entire length of the second side 52.

As can be understood from the above, the high-speed transverse field mode can be achieved in the structure of the present embodiment. Furthermore, since comblike electrodes 5a and 5b include the first part P1, second part P2, and third part P3, the alignment stability can be improved more.

In addition, the present embodiment can achieve the same advantages obtained by the first embodiment.

Note that the structures of the first and second embodiments can arbitrarily be varied. Hereinafter, some of variations will be explained.

Variation 1

In the examples of FIG. 2 and FIG. 12, the second electrode E2 is of double-edged structure in which comblike electrodes 5 extend from both sides of the connecting portion 3. However, the second electrode E2 may be of single-edged structure in which comblike electrodes 5 extend from either side of the connecting portion 3.

FIG. 13 shows an example of the second electrode E2 of single-edged structure. The structure in this example is applied to the second electrode E2 which functions as a pixel electrode, and includes the connecting portion 3 extending in the second direction Y and a plurality of comblike electrodes 5 extending from either side of the connecting portion 3 parallel to the first direction X.

A single-edged structure can be applied to a second electrode E2 which functions as a common electrode.

Variation 2

Figure 14:
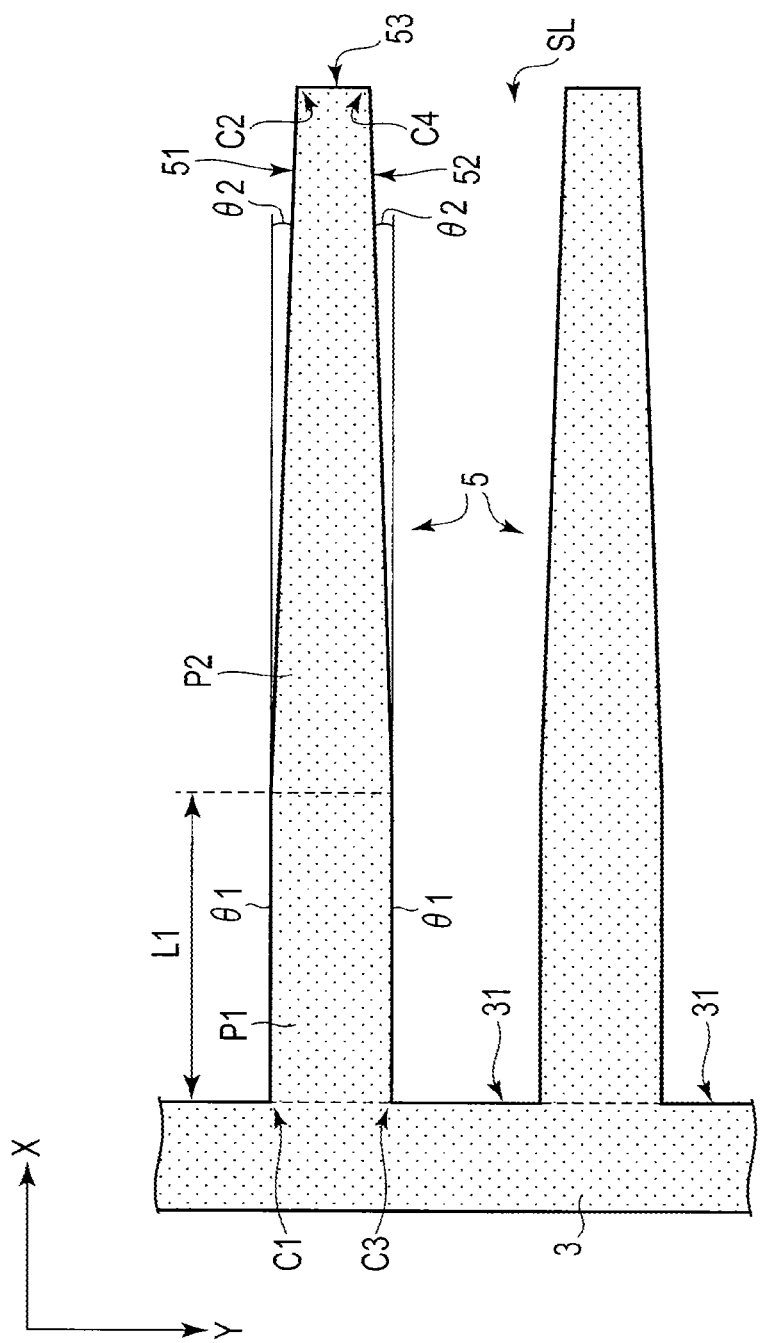
FIG. 14 shows a variation of a shape applicable to comblike electrodes.
Figure 15:
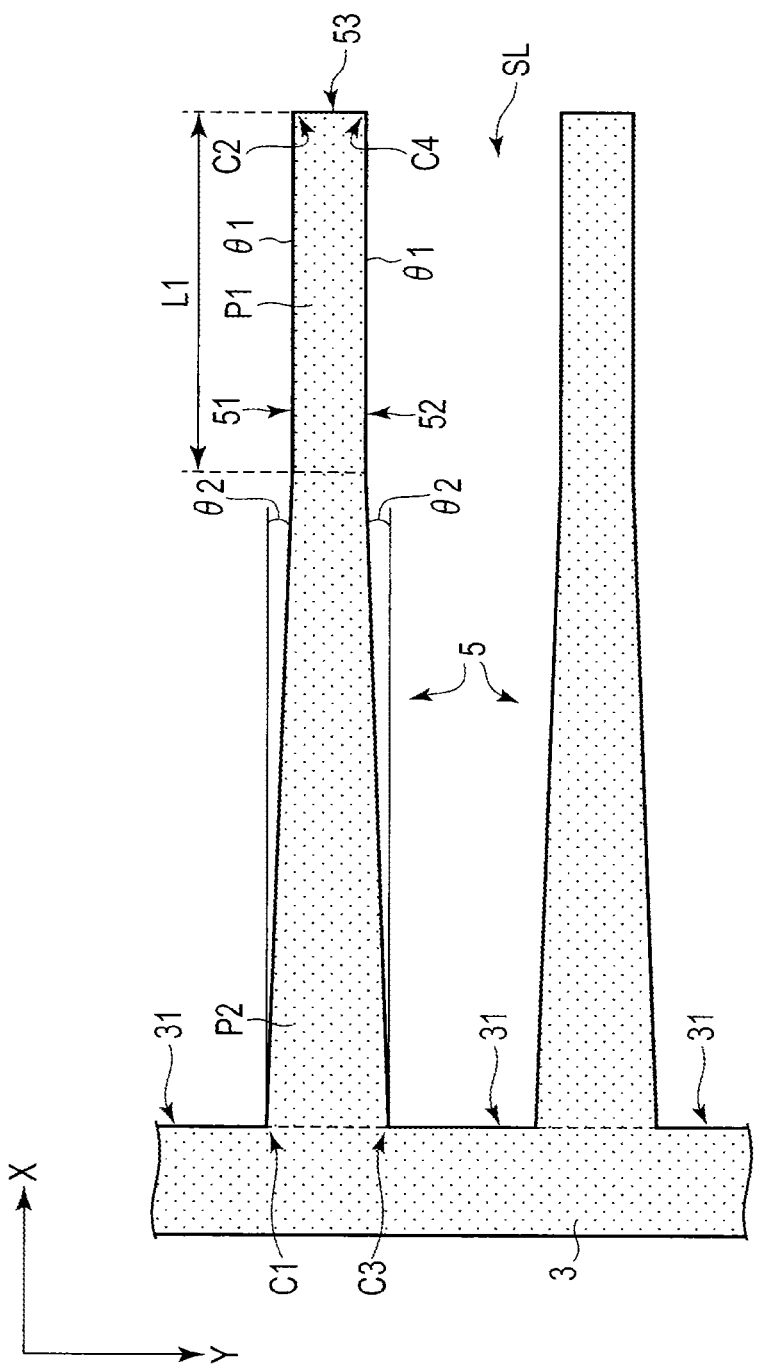
FIG. 15 shows another variation of a shape applicable to the comblike electrodes.

In the example of FIG. 9, the comblike electrode 5 has the first, second, and third parts P1 to P3. However, the comblike electrode 5 may only have the first and second parts P1 and P2. FIGS. 14 and 15 show examples of the comblike electrode 5 of this variation.

A comblike electrode 5 shown in FIG. 14 has a first part P1 at its base side (connecting portion 3 side) and does not have a third part P3. Conversely, a comblike electrode 5 shown in FIG. 15 has a first part at its tip side (top side 53) and does not have a third part P3.

In the first part P1 of both the examples of FIGS. 14 and 15, the first side 51 is inclined clockwise at angle θ1 which is acute or zero with respect to the first direction X, and the second side 52 is inclined counterclockwise at angle θ1 with respect to the first direction X. In these examples, angle θ1 is zero.

Even if the third part P3 is omitted as in this variation, angle θ2 in the second part P2 can be set large because of the first part P1. Thus, good alignment stability can be secured in the proximity of the second part P2. Note that, by setting the length L1 of the first part P1 such that corners C1 and C3 perform the alignment control function sufficiently in the example of FIG. 14 and such that corners C2 and C4 perform the alignment control function sufficiently in the example of FIG. 15, the alignment stability in the proximity of the first part P1 can also be secured.

Variation 3

In the first and second embodiments, the structures adoptable in cases where liquid crystal molecules of the liquid crystal layer LQ possess positive dielectric anisotropy are exemplified. However, the liquid crystal layer LQ may be formed of liquid crystal molecules possessing negative dielectric anisotropy. In that case, the alignment treatment direction AD (or the initial alignment direction of liquid crystal molecules) is set to a direction orthogonal to the extension of comblike electrodes 5 and slits SL.

Several embodiments of the present application have been presented above; however, they are examples of the present application and no limitation to the scope of invention is intended thereby. The novel embodiments described above can be achieved in other various models, and as long as they stay within the scope of the invention, can be achieved with various omission, replacement, and modification to their details. The embodiments and variations are encompassed by the scope and concept of the invention and included within the range equal to the inventions recited in the claims.

What is claimed is:

1. A display device comprising:
    a first substrate including a first electrode, an insulating layer covering the first electrode, a second electrode opposed to the first electrode with the insulating layer interposed therebetween, and a first alignment film covering the second electrode;
    a second substrate including a second alignment film opposed to the first alignment film; and
    a liquid crystal layer including liquid crystal molecules sealed between the first alignment film and the second alignment film, wherein
    the second electrode includes a plurality of comblike electrodes extending parallel to a first direction and tapered toward tips thereof, and a connecting portion which connects the comblike electrodes,
    an initial alignment direction of the liquid crystal molecules is parallel to the first direction or a second direction which is orthogonal to the first direction,
    the comblike electrode includes a first part having sides opposed to each other in the second direction each form a first angle with the first direction, and a second part having sides opposed to each other in the second direction each form a second angle with the first direction, the second angle being greater than the first angle, and
    the comblike electrode has the first part at the tip side and the second part at the connecting portion side.

2. The display device of claim 1, wherein a length of the first part is less than or equal to 5 µm.

3. The display device of claim 1, wherein the first angle is substantially zero.

4. The display device of claim 1, wherein the second angle is greater than or equal to 1.0 degree.

5. The display device of claim 1, wherein the liquid crystal molecules have positive dielectric anisotropy, and the initial alignment direction is parallel to the first direction.

6. The display device of claim 1, wherein the comblike electrodes include a plurality of first comblike electrodes extending from the connecting portion in the first direction and arranged along the second direction, and a plurality of second comblike electrodes extending from the connecting portion in the direction opposite to the first direction and arranged along the second direction.

7. The display device of claim 6, wherein the first comblike electrodes and the second comblike electrodes are symmetrical with respect to an axis parallel to the second direction.

8. The display device of claim 6, wherein the first comblike electrodes and the second comblike electrodes are arranged alternately in the second direction.

9. The display device of claim 1, wherein the first substrate is provided with a plurality of subpixels, the second electrode is provided over the plurality of subpixels and includes an aperture closed by the connecting portion, and the comblike electrodes are arranged in the aperture.

* * * * *